(12) United States Patent
Chukka (10) Patent No.: US 11,070,987 B1
(45) Date of Patent: Jul. 20, 2021

(54) DYNAMIC ANTENNA ARRAY ROTATION

(71) Applicant: T-MOBILE INNOVATIONS LLC, Overland Park, KS (US)

(72) Inventor: Chaitanya Chukka, Carol Stream, IL (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/689,736

(22) Filed: Nov. 20, 2019

(51) Int. Cl.
| | |
|---|---|
| *H04W 16/28* | (2009.01) |
| *H01Q 3/08* | (2006.01) |
| *H01Q 21/06* | (2006.01) |
| *H04W 64/00* | (2009.01) |
| *H01Q 1/24* | (2006.01) |
| *H01Q 3/00* | (2006.01) |

(52) U.S. Cl.
CPC .......... *H04W 16/28* (2013.01); *H01Q 1/246* (2013.01); *H01Q 3/005* (2013.01); *H01Q 3/08* (2013.01); *H01Q 21/062* (2013.01); *H04W 64/006* (2013.01)

(58) Field of Classification Search
CPC .. H01Q 3/04; H01Q 3/02; H01Q 3/24; H01Q 21/00; H01Q 21/24; H01Q 21/28; H01Q 25/002; H01Q 25/005; H01Q 3/12; H01Q 3/005; H01Q 3/06; H01Q 1/18; H04B 7/0456; H04B 7/0617; H04B 7/0817; H04B 17/12; H04W 16/28
See application file for complete search history.

(56) References Cited

U.S. PATENT DOCUMENTS

| | | | | |
|---|---|---|---|---|
| 5,548,837 | A * | 8/1996 | Hess | H04B 7/10 343/757 |
| 8,498,207 | B2 * | 7/2013 | Trigui | H04L 41/5025 370/235 |
| 10,080,229 | B2 * | 9/2018 | Calin | H04W 88/16 |
| 2014/0036656 | A1 * | 2/2014 | Chou | H04L 45/306 370/216 |
| 2014/0235254 | A1 * | 8/2014 | Brisebois | H04W 8/22 455/446 |
| 2016/0308625 | A1 * | 10/2016 | Chen | H04W 48/20 |
| 2018/0358689 | A1 * | 12/2018 | Ke | H01Q 1/185 |
| 2019/0190144 | A1 * | 6/2019 | Larson | G01S 7/02 |
| 2020/0084645 | A1 * | 3/2020 | Jones | H04W 24/02 |

* cited by examiner

*Primary Examiner* — Liton Miah (57) ABSTRACT

Methods and systems are provided for dynamically modifying a position of an antenna array having a plurality of dipole elements. Initially, it is determined that a quantity of user devices that are attached to the antenna array is at or near a capacity that is able to attach to the antenna array in its current position. An instruction is communicated to rotate the antenna array from a first position to a second position. The current quantity of user devices attached to the antenna array is continually monitored to determine when to instruct that the antenna array be rotated from the second position back to the first position.

20 Claims, 7 Drawing Sheets

FIG. 7

DYNAMIC ANTENNA ARRAY ROTATION

SUMMARY

The present disclosure is directed, in part, to enabling the rotation of an antenna array from a first position to a section position, where the rotation may be, for example, about 90 degrees. This rotation allows for at least a partially different set of user devices to be served by the antenna array, such as user devices physically located in a venue, such as an indoor venue having vertical seating. Moving the antenna array from a first position that serves mostly user devices in a horizontal plane to a second position that is able to serve user devices in a vertical plane allows for user devices located at a higher elevation than others to be served by the antenna array. The network makes a determination to instruct that the antenna array be rotated based on a number of factors, including, but not limited to, a location of user devices not currently being served by the antenna array, a quantity of user devices that could be served should the antenna array be rotated, a quantity of user devices currently being served by the antenna array being at or near capacity for that particular position, etc.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Generally, antenna arrays located at a base station, transmit or receive signals according to a single protocol. An example of this is a 4G base station that uses one or more eNodeBs to wirelessly communicate with user equipment (UE) according to the 4G protocol. In another example, a 5G base station may use one or more gNodeBs to wirelessly communicate with user equipment according to the 5G standard. Generally, an antenna array is a set of multiple connected antennas that work together as a single device, or a single antenna, to transmit or receive radio waves. This grouping of antennas that work as one enables production of radiation patterns that cannot be produce by individual antennas, also called elements. An antenna element that transmits and one that receives, together, may be referred to as an antenna dipole.

Massive MIMO systems are the next generation hardware capable of increasing throughputs and coverage using 3D beamforming while minimizing cable loss. There may be large beamforming gains that may be capable of both horizontal and vertical beamforming. This solution is good in urban and other dense environments, but it is not ideal for indoor or stadium events due to the capacity breakpoint. As such, there is a need for some antennas to be placed indoors, such as in the inside venues, as described above. When traffic in the venue increases, such as when there is an event taking place, stationary antenna arrays are not ideal.

Antenna arrays may vary in size, such as a 4×4 antenna array (4 columns and 4 rows), a 4×8 antenna array (4 columns and 8 rows), an 8×8 antenna array (8 columns and 8 rows), a 16×16 antenna array (16 columns and 16 rows), or the like. Regardless of the size of the antenna array, aspects herein provide for a dynamic rotation of the antenna array, such as by about 90 degrees in one direction each time a rotation is made. A first position of the antenna array may be ideal for user devices dispersed in a horizontal plane, but a second position may be ideal for user devices vertically dispersed, such as with stadium or other elevation seating (e.g., sporting event stadiums, concert halls, music halls, event spaces). Therefore, as described further herein, allowing for rotation of an antenna array provides for better user experience when more user devices can be served in a large indoor space.

In a first aspect, one or more computer-readable media having computer-executable instructions embodied thereon are provided that, when executed, perform a method for dynamically modifying a position of an antenna array having a plurality of dipole elements. The method comprises determining that a quantity of user devices attached to the antenna array is at or near a capacity of user devices that may attach to the antenna array, communicating an instruction to rotate the antenna array from a first position to a second position, and continually monitoring a current quantity of user devices attached to the antenna array to determine when to instruct that the antenna array be rotated from the second position to the first position.

In a second aspect, a method for dynamically modifying a position of an antenna array having a plurality of dipole elements is provided. The method comprises determining that a first quantity of user devices currently attached to the antenna array is at or near a capacity of user devices that may attach to the antenna array, analyzing a location of at least a portion of a second quantity of user devices that are not currently served by the antenna array, and based on the determining and the analyzing, communicating an instruction to rotate the antenna array from a first position to a second position. The method further comprises continually monitoring a current quantity of user devices attached to the antenna array to determine when to instruct that the antenna array be rotated from the second position to the first position.

In a third aspect, a system is provided for modifying a position of an antenna array having a plurality of dipole elements. The system comprises a processor and one or more computer storage hardware devices storing computer-usable instructions that, when used by the processor, cause the processor to perform a method. The method comprises determining that a quantity of user devices attached to the antenna array is above a threshold of user devices that may attach to the antenna array in the antenna array's current position, wherein the current position is a first position. The method further comprises determining that a higher quantity of user devices would be able to attach to the antenna array if the antenna array is rotated from the first position to a second position, communicating an instruction to rotate the antenna array from the first position to a second position, and continually monitoring a current quantity of user devices attached to the antenna array to determine when to instruct that the antenna array be rotated from the second position to the first position.

Throughout the description herein, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention.

Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
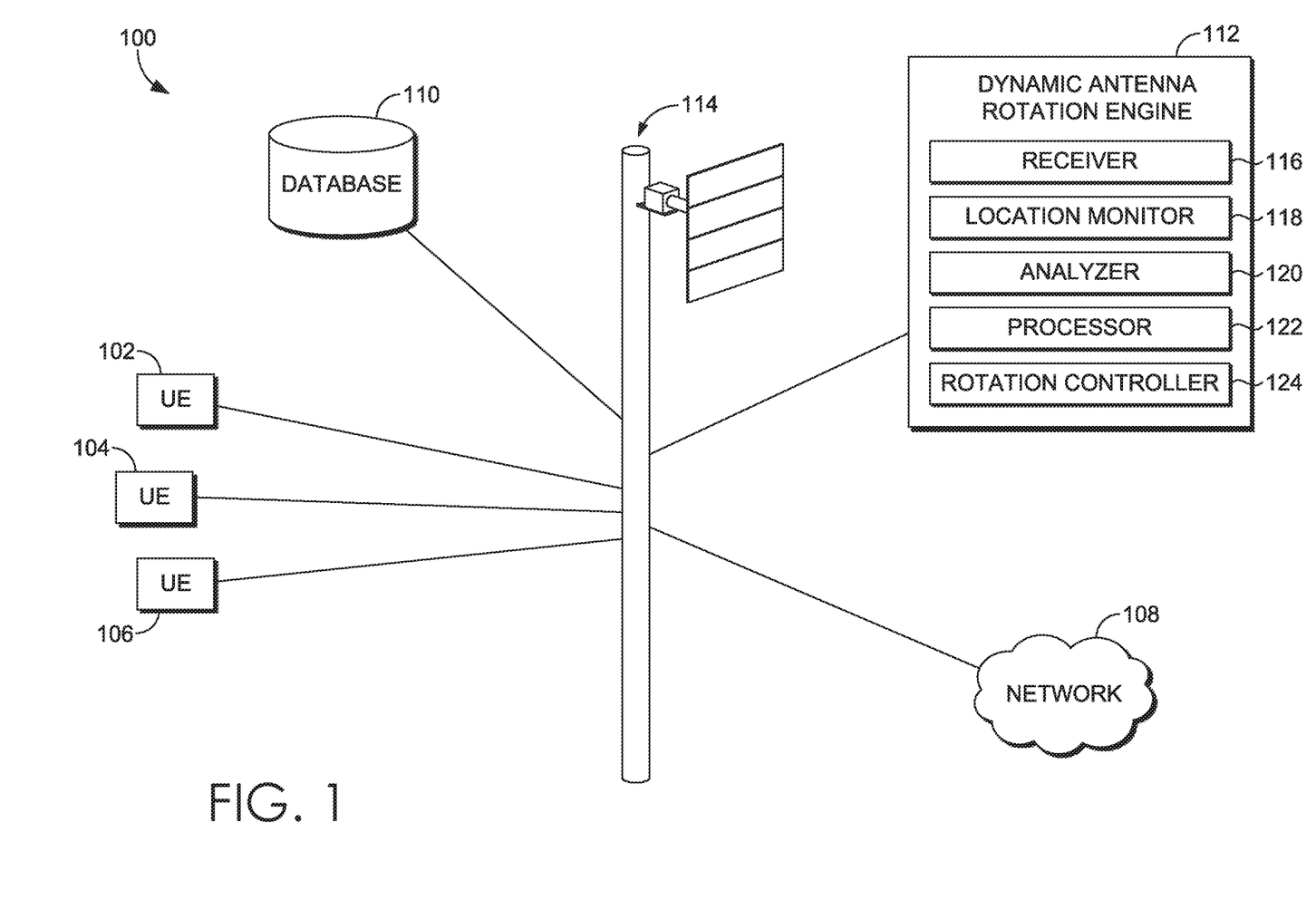
FIG. 1 depicts a diagram of an exemplary network environment suitable for use in implementations of the present disclosure.

Referring to FIG. 1, an exemplary network environment is provided in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

FIG. 1 illustrates a cell site 114 having an antenna, which includes a plurality of antenna dipoles. While FIG. 1 illustrates a particular quantity of antenna dipoles, the quantity can vary based on needs of a particular location. Cell site 114 is in communication with user devices, including 102, 104, and 106. While three user devices are illustrated in FIG. 1, likely many more than three will be present. For example, if cell site 114 were to be used at an indoor sports stadium, likely thousands or even tens of thousands of user devices may be served by a cell site. In aspects, the antenna may include a certain quantity of vertical columns of dipoles and a certain quantity of horizontal rows of dipoles. For instance, the antenna could be an 8×8 array (e.g., 8 horizontal rows and 8 vertical columns) or a 16×16 array (e.g., 16 horizontal rows and 16 vertical columns).

Each user device illustrated in FIG. 1 includes a communication link to the cell site. Communications links, such as the wireless telecommunication links shown in FIG. 1 between each of the user devices and the cell site 114, may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short-range and long-range as different categories, or types, of connections (i.e., a primary connection and a secondary connection). A short-range connection may include a Wi-Fi connection to a device (e.g., mobile hotspot) that provides access to a communications network, such as a WLAN connection using 802.11 protocol. A short-range connection may also utilize mobile broadband, which provides wireless Internet access using a mobile broadband router. One example of mobile broadband technology is Evolution Data Optimized, or EVDO. EVDO relies on a signal from a wireless tower rather than a physical connection like a phone line or cable. An EVDO modem receives the signal and allows a user to connect to the Internet. Another example of mobile broadband is HSPA. A long-range connection may include a connection using one or more of CDMA, GPRS, GSM, TDMA, 802.16, and the like.

In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices. In some aspects, user devices 102, 104, and 106 can correspond to computing device 700 in FIG. 7. Thus, a user device can include, for example, a display(s), a power source(s) (e.g., a battery), a data store(s), a speaker(s), memory, a buffer(s), a radio(s), and the like. In some implementations, user devices 102, 104, and 106 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

The antenna array of cell site 114 includes multiple antenna dipoles that are used for receiving and transmitting data between the cell site 114 and the user devices 102, 104, and 106 by way of network 108, which may be a wireless communications network. FIG. 1 also includes dynamic antenna rotation engine 112, which includes various components including receiver 116, location monitor 118, analyzer 120, processor 122, and rotation controller 124.

Receiver 116 of the dynamic antenna rotation engine 112 is configured to receive information associated with the user devices that are in a coverage area of cell site 114. Such information may include location information of the user devices, quantities of user devices that are currently attached to the cell site 114 and user devices that are not currently attached to the cell site 114 but which could be attached if the antenna were to be rotated, etc. In some aspects, database 110 may be used to store such information received by receiver 116.

Location monitor 118 uses the location information received by receiver 116 and continually monitors the location of the user devices. In one aspect, the cell site 114 may be located in an indoor sporting stadium or another type of indoor venue that can hold hundreds or more commonly thousands of people, which can mean an equivalent or almost equivalent number of user devices within that space. Further, indoor venues may have elevational seating such that some user devices are physically lower (at or near ground level) and others may be much higher. For this reason, it is advantageous for an antenna array to be able to rotate to accommodate more user devices based on their locations and potential quantity of user devices served after a rotation.

Analyzer 120 is configured to analyze locations and quantities, as received by the receiver 116 and monitored by the location monitor 118, to dynamically determine when the antenna array should be rotated. In one instance, if a quantity of user devices that could be served should the antenna array be rotated is greater or significantly greater than a current quantity of user devices served, the analyzer 120 may determine that a rotation should occur. The analyzer 120 may also take into account that all or most of the user devices that are currently served, before rotation, would still need to be served once the antenna array is in rotation, so as not to disturb the continuity of service for those user devices.

Processor 122, in embodiments, is a node, such as an eNodeB or a gNodeB, which is responsible for instructing the motor, or in some cases the rotation controller 124, that controls movement of the antenna array to cause the antenna array to move. While not described herein, processor 122 performs many other network functions. Rotation controller 124 may take instructions from the processor 122 and cause the motor to operate in a way such that the antenna array moves. The rotation controller 124 may also tell the motor exactly how to move, such as in which direction and by how many degrees. In one aspect, the antenna array may move from a first position to a second position, where the second position is about 90 degrees of rotation from the first position. The antenna array may then move, at a time determined by the dynamic antenna rotation engine 112, back to the first position.

Figure 2A:
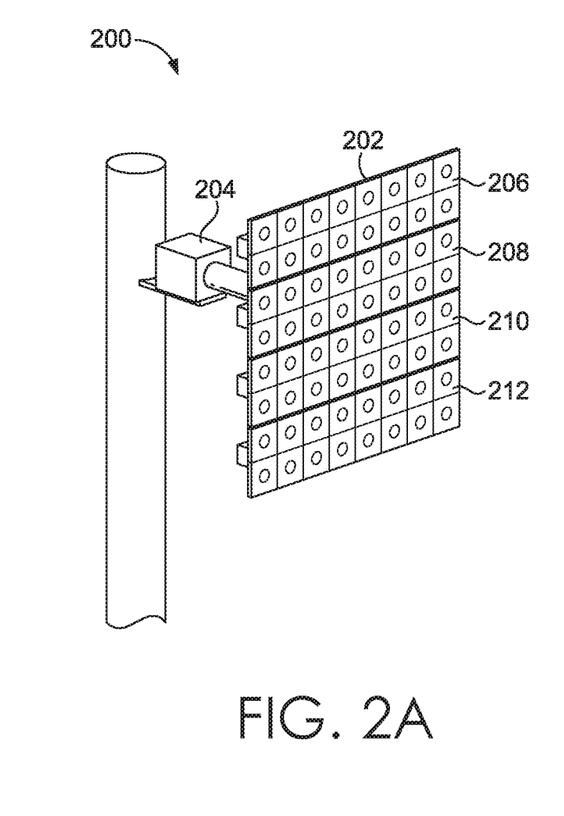
FIG. 2A depicts a diagram of a rotatable antenna array in a first position, in accordance with aspects of the present disclosure.
Figure 2B:
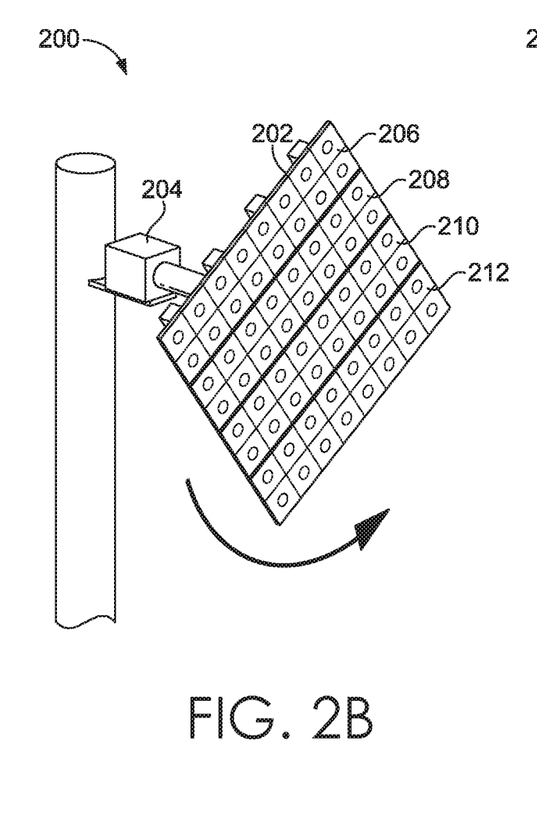
FIG. 2B depicts a diagram of a rotatable antenna array in a second position, in accordance with aspects of the present disclosure.
Figure 2C:
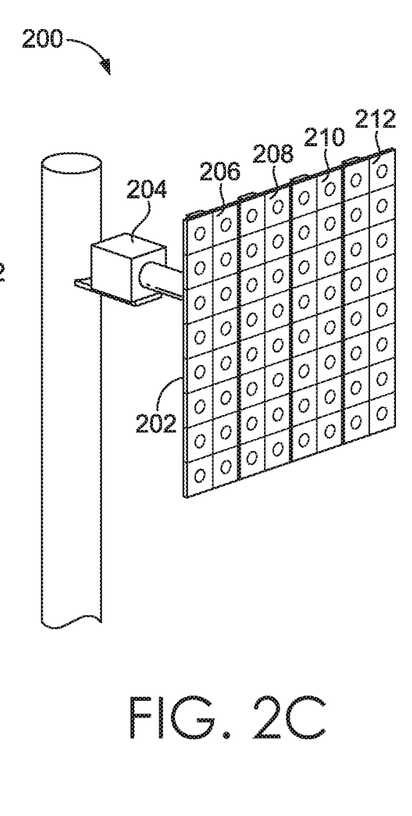
FIG. 2C depicts a diagram of a rotatable antenna array in a third position, in accordance with aspects of the present disclosure.

FIGS. 2A, 2B, and 2C depict diagrams of a rotatable antenna array 200 in various positions. For instance, FIG. 2A depicts the antenna array in a first position, FIG. 2B depicts antenna array while it is being rotated, and FIG. 2C depicts the antenna array in a second position. Referring initially to FIG. 2A, antenna array 202 is coupled to motor 204, which is used to cause antenna array 202 to rotate. In aspects, motor 204 may be a digital stepper motor capable of rotation behind the massive MIMO unit (MMU) mount and tuned based on the capacity requirements of the end user. In aspects, the antenna array 202, as shown, includes four sections, including section 206, 208, 210, and 212. Here, each section includes 2 horizontal rows of dipoles and 8 vertical rows of dipoles (e.g., 2V8H). However, antenna arrays may include different quantities of dipoles in both the horizontal rows and vertical columns, and an 8V8H antenna array (e.g., 64T64R) is illustrated in these figures for exemplary purposes only. For example, a 16V16H or a 4V4H antenna could also be selected for use in a particular venue, and may be selected based on a potential quantity of user devices being served within that particular venue. FIG. 2B illustrates the antenna array 202 being rotated by motor 204. FIG. 2C illustrates antenna array 202 after it has been rotated 90 degrees into a second position.

Figure 3A:
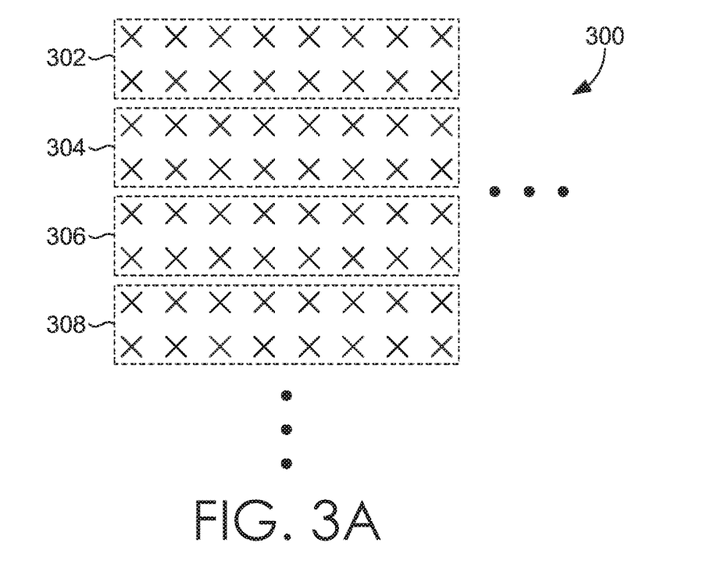
FIG. 3A depicts a diagram of antenna dipoles of an antenna array, in accordance with aspects of the present disclosure.
Figure 3B:
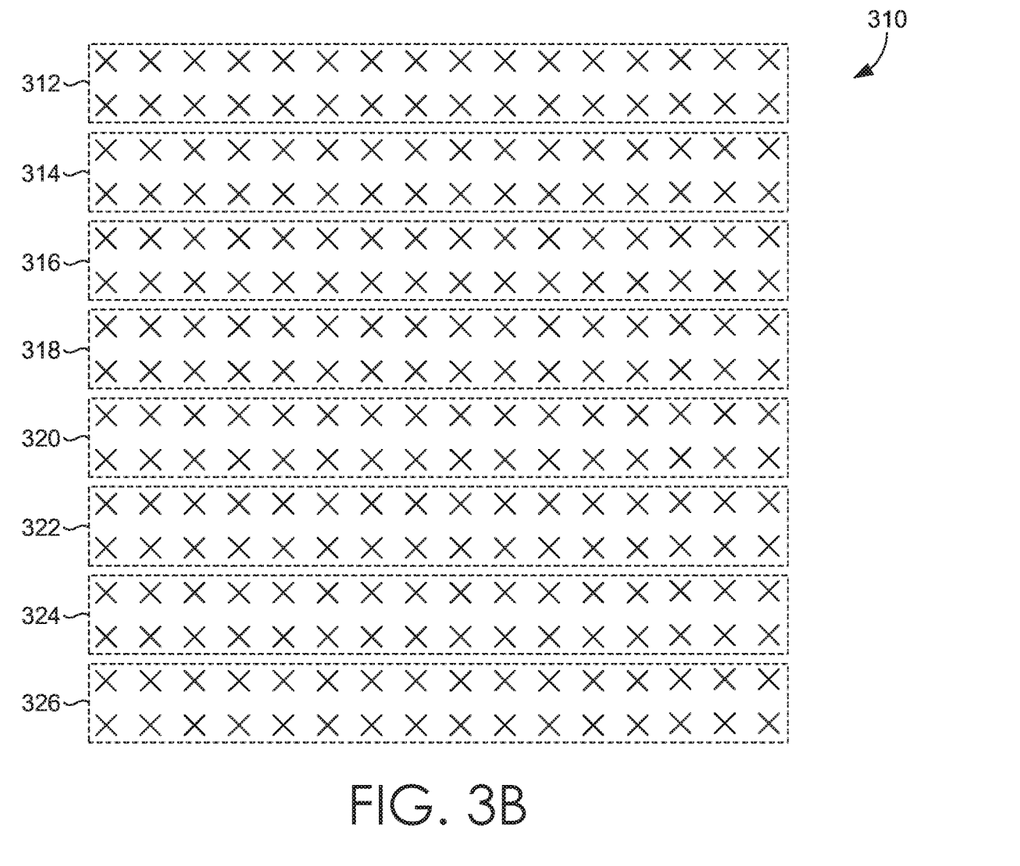
FIG. 3B depicts a diagram of antenna dipoles of another antenna array, in accordance with aspects of the present disclosure.

FIG. 3A depicts a diagram of antenna dipoles of an antenna array 300, in accordance with aspects of the present disclosure. In this figure, the antenna dipoles are divided into various portions, including portion 302, 304, 306, and 308. As mentioned earlier, any number of antenna dipoles may be used in an antenna array. As indicated by the ellipses in FIG. 3A, more antenna elements could be used in embodiments herein, but also less dipoles may be used. FIG. 3B illustrates antenna array 310 having portions 312, 314, 316, and 318. Here, although the physical dipoles are equally split 16×16, the logical channels may be designed to be something other than 16×16, such as 4×16, giving more edge to the horizontal portion of the beam than the vertical side. Aspects herein allow for the rotation of the antenna array, such as antenna array 310, so that focus can be more on the vertical portion and the overall MIMO layers are changed to 16×4, rather than 4×16. In aspects, this rotation can be used to better handle indoor capacity, such as a stadium where seating moves in the vertical position such that user devices are distributed between ground level and higher. Rotating the antenna array reverses the horizontal and vertical patterns of the antenna radiation.

Many benefits can be seen using aspects herein. For example, the MMU may be enabled for indoor usage, such as a stadium or other indoor venue where thousands or hundreds of thousands of user devices are present, and where the user devices are vertically distributed within that venue. Also, aspects provide for dynamic rotation capabilities to address capacity needs. Additionally, user intervention is not needed, even though the antenna array's position is physically changing. This dynamic solution can account for different capacity needs.

Figure 4:
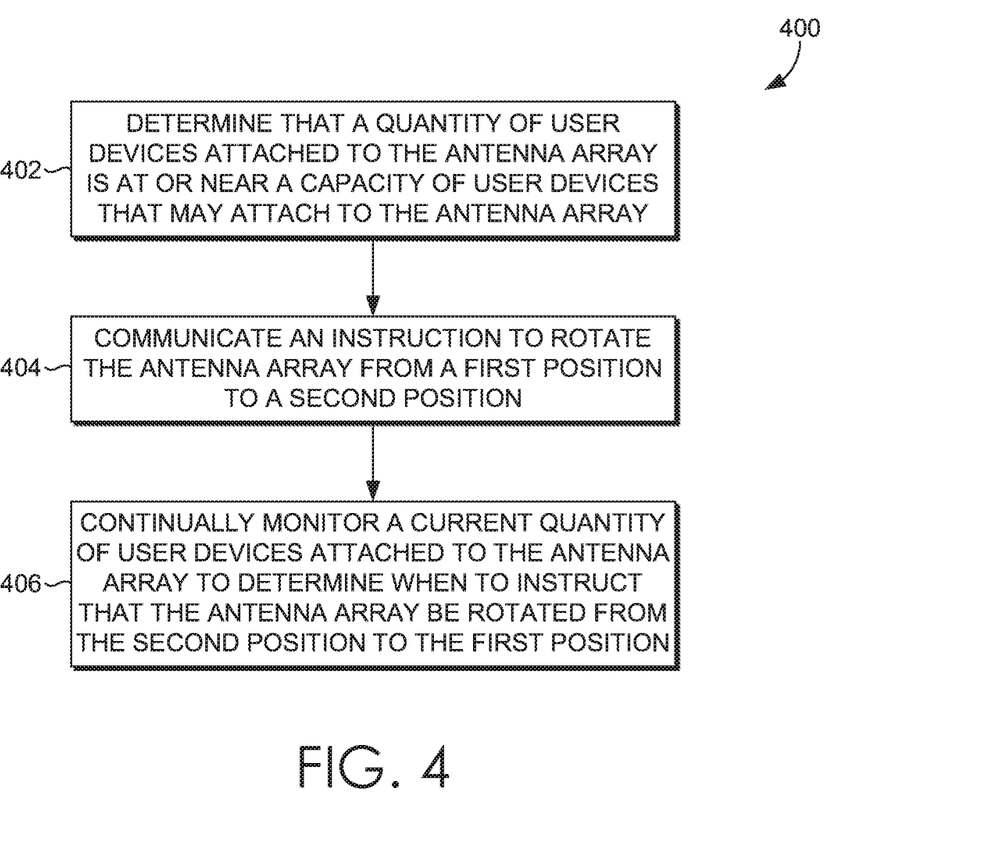
FIGS. 4-6 depict flow diagrams of exemplary methods for dynamically modifying a position of an antenna array having a plurality of dipole elements, in accordance with implementations of the present disclosure.

FIG. 4 depicts a flow diagram of exemplary method 400 for dynamically modifying a position of an antenna array having a plurality of dipole elements, in accordance with an implementation of the present disclosure. Initially, at block 402, it is determined that a quantity of user devices attached to the antenna array is at or near a capacity of user devices that may attach to the antenna array. At block 404, an instruction is communicated to rotate the antenna array from a first position to a second position. At block 406, a current quantity of user devices attached to the antenna array is continually monitored to determine when to instruct that the antenna array is to be rotated from the second position to the first position.

Figure 5:
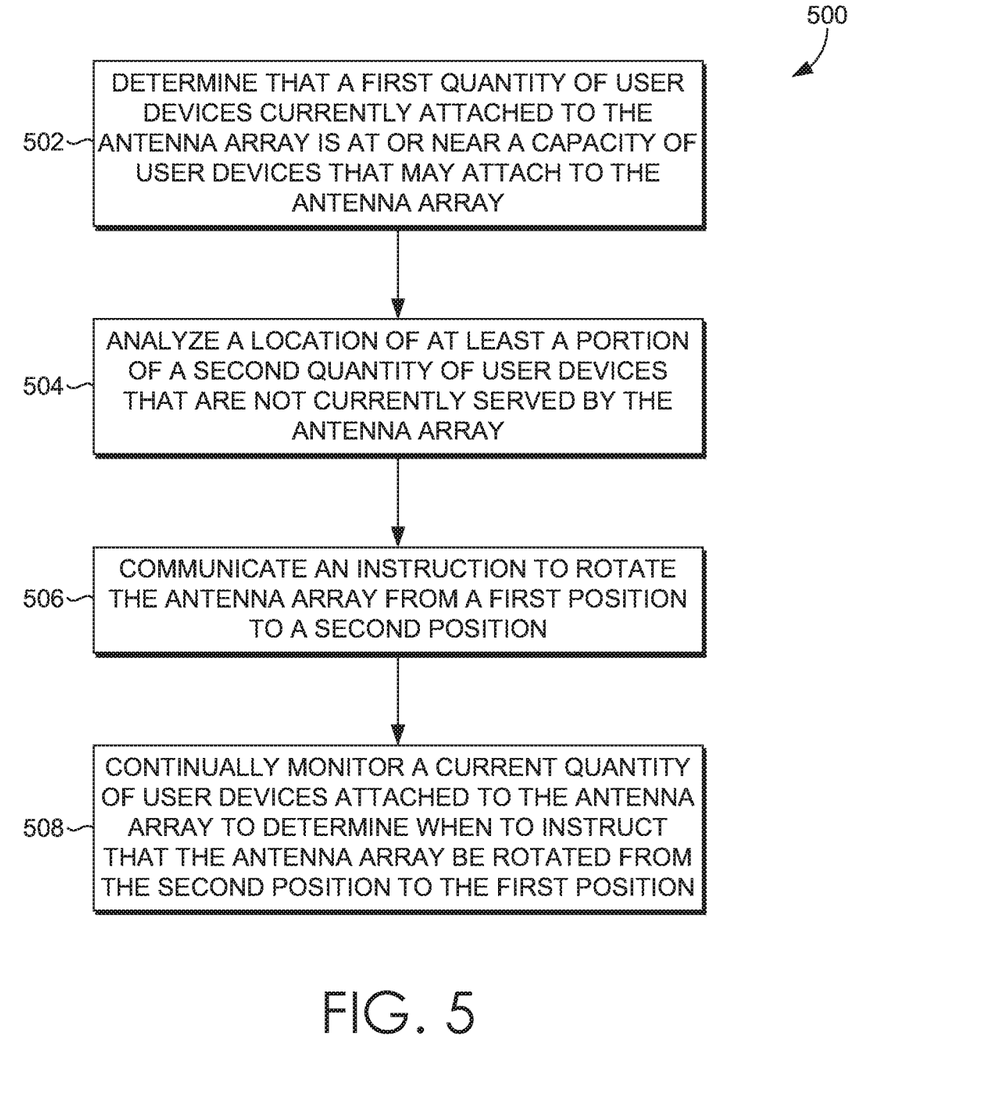

Turning now to FIG. 5, FIG. 5 depicts a flow diagram of another exemplary method 500 for dynamically modifying a position of an antenna array having a plurality of dipole elements, in accordance with an implementation of the present disclosure. Block 502 illustrates that it is determined that a quantity of user devices currently attached to the antenna array is at or near a capacity of user devices that may attach to the antenna array. At block 504, a location of some or all of a second quantity of user devices that is not currently served by the antenna array is analyzed. As shown at block 506, an instruction to rotate the antenna array from a first position to a second position is communicated. In determining to make this instruction, the quantity of user devices not currently served by the antenna array but that could be served by the antenna array may be taken into account. Additionally, the user devices served by the antenna array while the antenna array is in the first position is also considered, as the network would want to keep detachments from the antenna array to a minimum, or put another way, the network wouldn't want to lose connection with one user device just to pick up another. At block 508, a current quantity of user devices attached to the antenna array is continually monitored to determine when to instruct that the antenna array is to be rotated from the second position to the first position.

Figure 6:
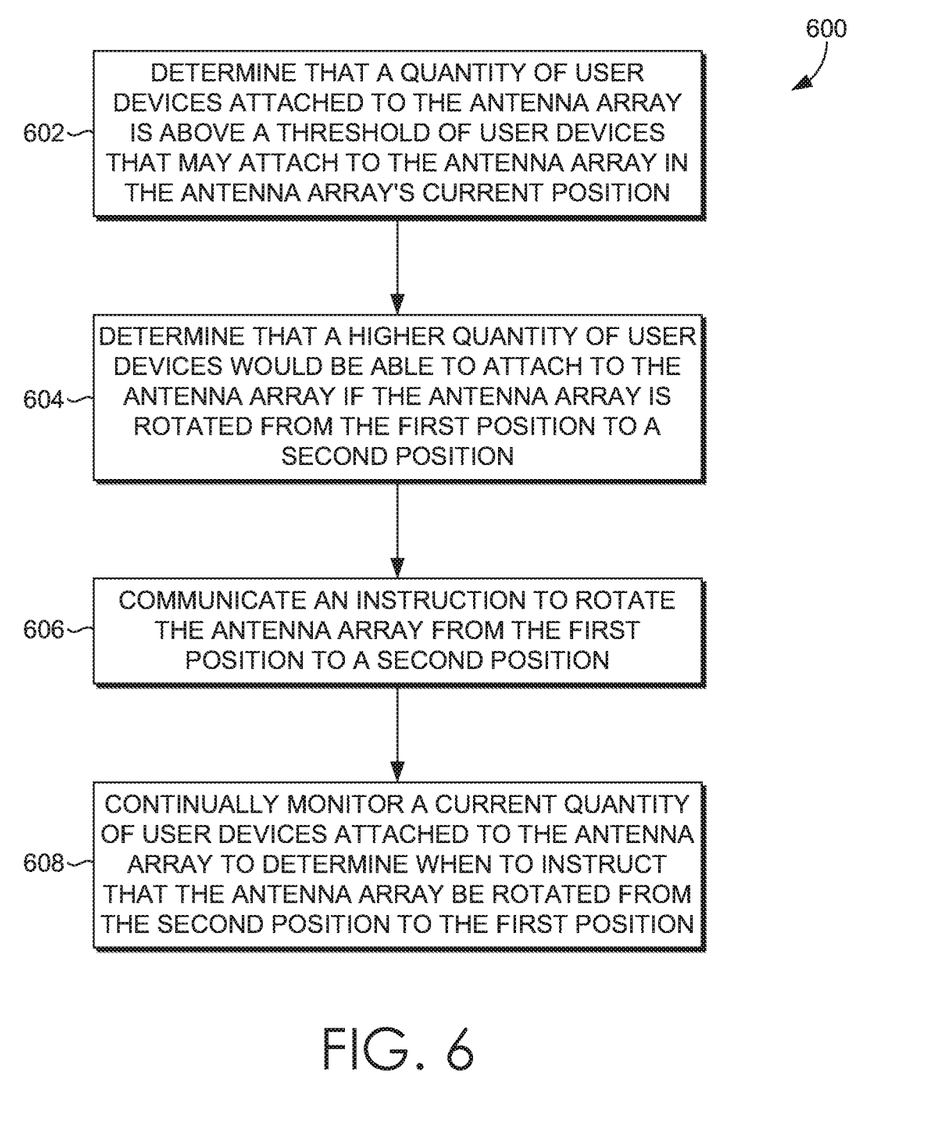

Referring to FIG. 6, FIG. 6 depicts a flow diagram of another exemplary method 600 for dynamically modifying a position of an antenna array having a plurality of dipole elements, in accordance with an implementation of the present disclosure. At block 602, it is determined that a quantity of user devices attached to the antenna array is above a threshold that may attach to the antenna array while the antenna array is in its current position, or a first position. At block 604, it is determined that a higher quantity of user devices would be able to attach to the antenna array if the antenna array is rotated from the first position to a second position. At block 606, an instruction is communicated to rotate the antenna from the first position to the second position. As shown at block 608, the current quantity of user devices attached to the antenna array is continually monitored to determine when to instruct that the antenna array be rotated from the second position to the first position. In an aspect, the same or similar criteria may be used to determine when to instruct that the antenna array be rotated from the second position back to the first position. For instance, a quantity of user devices that could be served by the antenna array if the antenna array were to be rotated from the second position back to the first position may be considered. Location of user devices within the venue may also be considered. As with rotating to the second position, the network may evaluate whether the antenna array would be able to serve user devices currently being served while the antenna array is in the first position if the antenna array were to be rotated to the second position. This could be determined by location of the user devices, including an elevation of each. When the antenna array rotates, it may be able to serve either more user devices in a vertical direction, or more user devices in a horizontal direction, such would be the case in a venue having vertical seating (e.g., stadium).

Figure 7:
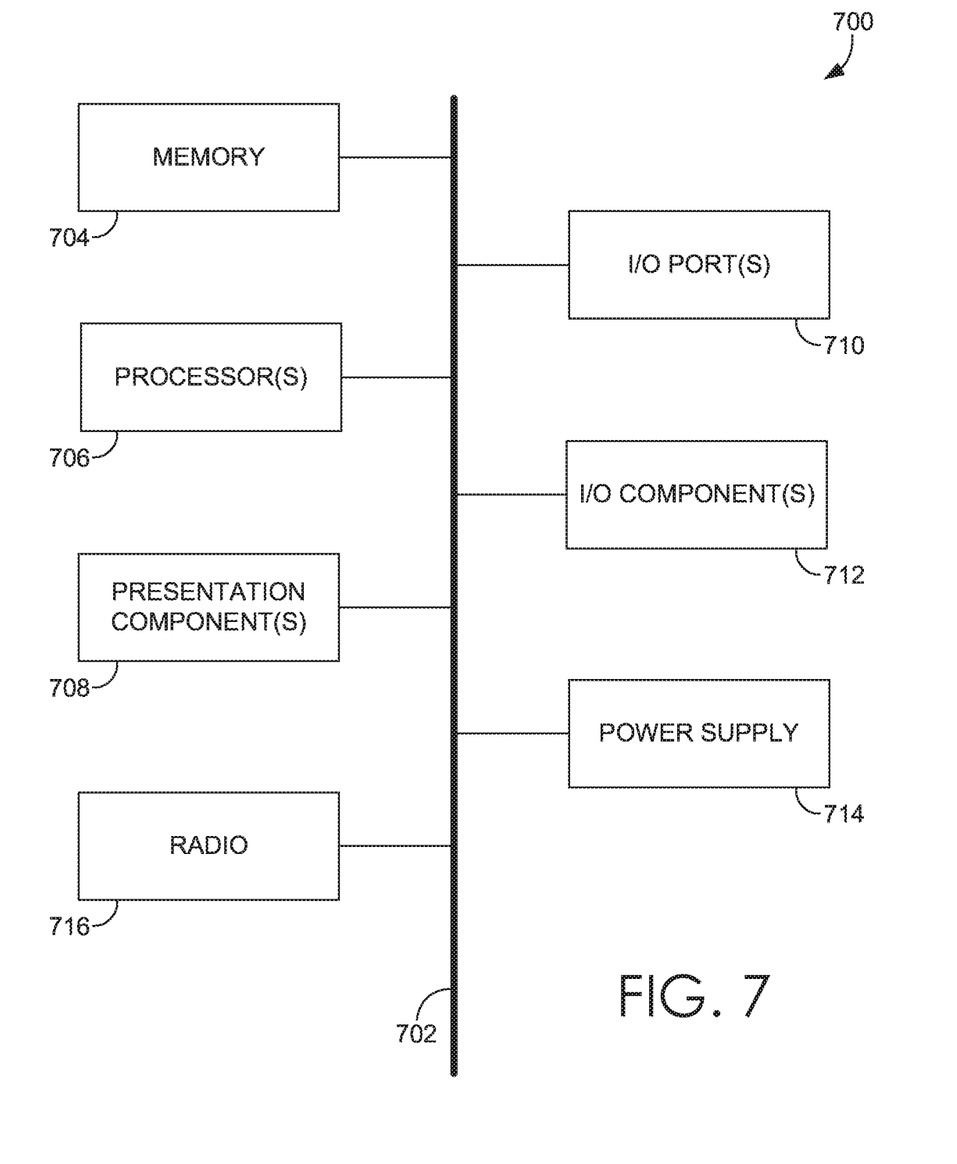
FIG. 7 depicts an exemplary computing environment suitable for use in implementation of the present disclosure.

Referring to FIG. 7, a diagram is depicted of an exemplary computing environment suitable for use in implementations of the present disclosure. In particular, the exemplary computer environment is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 702 that directly or indirectly couples the following devices: memory 704, one or more processors 706, one or more presentation components 708, input/output (I/O) ports 710, I/O components 712, and power supply 714. Bus 702 represents what may be one or more busses (such as an address bus, data bus, or combination thereof). Although the devices of FIG. 7 are shown with lines for the sake of clarity, in reality, delineating various components is not so clear, and metaphorically, the lines would more accurately be grey and fuzzy. For example, one may consider a presentation component such as a display device to be one of I/O components 712. Also, processors, such as one or more processors 706, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 704 includes computer-storage media in the form of volatile and/or nonvolatile memory. Memory 704 may be removable, nonremovable, or a combination thereof. Exemplary memory includes solid-state memory, hard drives, optical-disc drives, etc. Computing device 700 includes one or more processors 706 that read data from various entities such as bus 702, memory 704 or I/O components 712. One or more presentation components 708 presents data indications to a person or other device. Exemplary one or more presentation components 708 include a display device, speaker, printing component, vibrating component, etc. I/O ports 710 allow computing device 700 to be logically coupled to other devices including I/O components 712, some of which may be built in computing device 700. Illustrative I/O components 712 include a microphone, joystick, game pad, satellite dish, scanner, printer, wireless device, etc.

Radio 716 represents a radio that facilitates communication with a wireless telecommunications network. Illustrative wireless telecommunications technologies include CDMA, GPRS, TDMA, GSM, and the like. Radio 716 might additionally or alternatively facilitate other types of wireless communications including Wi-Fi, WiMAX, LTE, or other VoIP communications. As can be appreciated, in various embodiments, radio 716 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more computer-readable media having computer-executable instructions embodied thereon that, when executed, perform a method for dynamically modifying a position of an antenna array having a plurality of dipole elements, the method comprising:
   determining that a first quantity of user devices are attached to the antenna array in the antenna array's current position, wherein the current position is a first position;
   identifying a second quantity of user devices that could be served by the antenna array in a second position, wherein the second quantity of user devices is greater than the first quantity of user devices;
   based on the second quantity of user devices being greater than the first quantity of user devices, communicating an instruction to rotate the antenna array from the first position to the second position; and
   continually monitoring a current quantity of user devices attached to the antenna array to dynamically determine when to instruct that the antenna array be rotated back from the second position to the first position.

2. The one or more computer-readable media of claim 1, wherein the antenna array has sixteen vertical columns of dipoles and sixteen horizontal rows of dipoles.

3. The one or more computer-readable media of claim 1, wherein the antenna array is rotated about 90 degrees.

4. The one or more computer-readable media of claim 1, wherein the determining the second quantity of user devices is based on a location of the second quantity of user devices.

5. The one or more computer-readable media of claim 1, further comprising determining a third quantity of user devices that could be served by the antenna array if the antenna array is rotated back from the second position to the first position.

6. The one or more computer-readable media of claim 5, wherein the determining the third quantity of user devices is based on a location of the third quantity of user devices.

7. The one or more computer-readable media of claim 1, wherein the first position is a horizontal position and the second position is a vertical position.

8. A method for dynamically modifying a position of an antenna array having a plurality of dipole elements, the method comprising:
   determining that a first quantity of user devices are currently attached to the antenna array in a current position, wherein the current position is a first position;
   identifying a second quantity of user devices and analyzing a location of at least a portion of the second quantity of user devices that are not currently served by the antenna array but could also be served by the antenna array if the antenna array is rotated from the first position to a second position;
   based on the determining and the analyzing, communicating an instruction to rotate the antenna array from the first position to the second position; and
   continually monitoring a current quantity of user devices attached to the antenna array to determine when to instruct that the antenna array be rotated from the second position to the first position.

9. The method of claim 8, further comprising determining that the second quantity of user devices is higher than the first quantity of user devices.

10. The method of claim 8, further comprising while the antenna array is in the second position, determining a third quantity of user devices that could be served by the antenna array if the antenna array is rotated from the second position to the first position.

11. The method of claim 8, wherein the antenna array is rotated about 90 degrees.

12. The method of claim 8, wherein the antenna array has sixteen vertical columns of dipoles and sixteen horizontal rows of dipoles.

13. The one or more computer-readable media of claim 8, wherein the first position is a horizontal position and the second position is a vertical position.

14. A system for modifying a position of an antenna array having a plurality of dipole elements, the system comprising:
    a processor; and
    one or more computer storage hardware devices storing computer-usable instructions that, when executed by the processor, cause the processor to:
    determine that a quantity of user devices attached to the antenna array is above a threshold quantity of user devices that may attach to the antenna array in the antenna array's current position, wherein the current position is a first position;
    determine that a higher quantity of user devices would be able to attach to the antenna array if the antenna array is rotated from the first position to a second position;
    communicate an instruction to rotate the antenna array from the first position to a second position; and
    continually monitor a current quantity of user devices attached to the antenna array to determine when to instruct that the antenna array be rotated from the second position to the first position.

15. The system of claim 14, wherein the first position is a horizontal position and the second position is a vertical position.

16. The system of claim 14, wherein determining that the quantity of user devices attached to the antenna array is above the threshold of user devices is based on a current location of the quantity of user devices.

17. The system of claim 14, further comprising determining a quantity of user devices that could be served by the antenna array if the antenna array is rotated from the second position to the first position.

18. The system of claim 17, wherein the determining the quantity of user devices is based on a current location of the quantity of user devices.

19. The system of claim 14, wherein the antenna array is rotated about 90 degrees.

20. The system of claim 14, wherein the antenna array has sixteen vertical columns of dipole elements and sixteen horizontal rows of dipole elements.

* * * * *